US008940355B2

(12) United States Patent
van den Berg et al.

(10) Patent No.: US 8,940,355 B2
(45) Date of Patent: *Jan. 27, 2015

(54) PROCESS FOR THE PREPARATION OF AN EDIBLE DISPERSION COMPRISING OIL AND STRUCTURING AGENT

(75) Inventors: Cornelia Sophia M van den Berg, Vlaardingen (NL); Eckhard Floter, Vlaardingen (NL); Gerrit Jan W Goudappel, Vlaardingen (NL); Johannes Jozef M Janssen, Vlaardingen (NL); Xavier Yves Lauteslager, Vlaardingen (NL); Gautam Satyamurthy Nivarthy, New York, NY (US); Frank Emile Wubbolts, Amsterdam (NL)

(73) Assignee: Conopco, Inc., Englewood Cliffs, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/224,550

(22) Filed: Sep. 2, 2011

(65) Prior Publication Data

US 2011/0311706 A1 Dec. 22, 2011

Related U.S. Application Data

(63) Continuation of application No. 10/564,944, filed on Jun. 20, 2006, now Pat. No. 8,025,913.

(30) Foreign Application Priority Data

Jul. 17, 2003 (EP) .................................... 03077247

(51) Int. Cl.
A23D 7/04 (2006.01)
A23L 1/39 (2006.01)
A23D 7/005 (2006.01)
A23D 9/007 (2006.01)
A23D 9/05 (2006.01)
A23L 1/24 (2006.01)

(52) U.S. Cl.
CPC ................ *A23L 1/39* (2013.01); *A23D 7/0053* (2013.01); *A23D 7/0056* (2013.01); *A23D 7/04* (2013.01); *A23D 9/007* (2013.01); *A23D 9/05* (2013.01); *A23L 1/24* (2013.01)
USPC ........................................ 426/602

(58) Field of Classification Search
USPC ........................................ 426/602
See application file for complete search history.

(56) References Cited

U.S. PATENT DOCUMENTS

| | | |
|---|---|---|
| 2,521,219 A | 9/1950 | Holman et al. |
| 2,615,160 A | 10/1952 | Baur |
| 2,815,286 A | 12/1957 | Andre |
| 3,120,438 A | 2/1964 | McIntire et al. |
| 3,170,799 A | 2/1965 | Feuge et al. |
| 3,270,040 A | 8/1966 | Bradshaw et al. |
| 3,295,986 A | 1/1967 | Saslaw et al. |
| 3,338,720 A | 8/1967 | Pichel |
| 3,425,843 A | 2/1969 | Japikse |
| 3,528,823 A | 9/1970 | Rossen |
| 3,881,005 A | 4/1975 | Thakkar et al. |
| 3,892,880 A | 7/1975 | Grolitsch |
| 4,160,850 A | 7/1979 | Hallstrom et al. |
| 4,226,894 A | 10/1980 | Gawrilow |
| 4,232,052 A | 11/1980 | Nappen |
| 4,234,606 A | 11/1980 | Gawrilow |
| 4,308,288 A | 12/1981 | Hara et al. |
| 4,375,483 A | 3/1983 | Shuford et al. |
| 4,385,076 A | 5/1983 | Crosby |
| 4,391,838 A | 7/1983 | Pate |
| 4,578,274 A | 3/1986 | Sugisawa et al. |
| 4,591,507 A | 5/1986 | Bodor et al. |
| 4,826,699 A | 5/1989 | Soe |
| 4,855,157 A | 8/1989 | Tashiro et al. |
| 4,889,740 A | 12/1989 | Price |
| 4,917,915 A | 4/1990 | Cain et al. |
| 5,130,156 A | 7/1992 | Bergquist et al. |
| 5,185,173 A | 2/1993 | Bethke et al. |
| 5,186,866 A | 2/1993 | Ryuo et al. |
| 5,352,475 A | 10/1994 | Tholl |
| 5,391,382 A | 2/1995 | Chappell |
| 5,429,836 A | 7/1995 | Fuisz |
| 5,447,735 A | 9/1995 | Miller |
| 5,516,543 A | 5/1996 | Amankonah et al. |
| 5,620,734 A | 4/1997 | Wesdorp et al. |
| 5,707,670 A | 1/1998 | Mehansho et al. |

(Continued)

FOREIGN PATENT DOCUMENTS

DE 2253515 5/1974
DE 10253111 5/2004

(Continued)

OTHER PUBLICATIONS

Munuklu, Dec. 16, 2005, Experimental and Analytical Facilities, Delft University of Technology 2005 4 pp. 41-51.
Assignment from FeyeCon to Unilever Nederland BV dated Jul. 17, 2003.
Acknowledgement from Frank E. Wubbolts bearing a date of Jul. 17, 2003 and signature dates of Nov. 25, 2003.
Co-pending application Dobenesque et al., U.S. Appl. No. 13/139,584, filed Sep. 8, 2011.

(Continued)

*Primary Examiner* — Carolyn Paden
(74) *Attorney, Agent, or Firm* — Gerard J. McGowan, Jr.

(57) ABSTRACT

The invention relates to a process for the preparation of an edible dispersion comprising oil and structuring agent and one or more of an aqueous phase and/or a solid phase, in which the dispersion is formed by mixing oil, solid structuring agent particles and the aqueous phase and/or the solid phase, wherein the solid structuring agent particles have a microporous structure of submicron size particles.

38 Claims, 10 Drawing Sheets

(56) References Cited

U.S. PATENT DOCUMENTS

Figure 1:
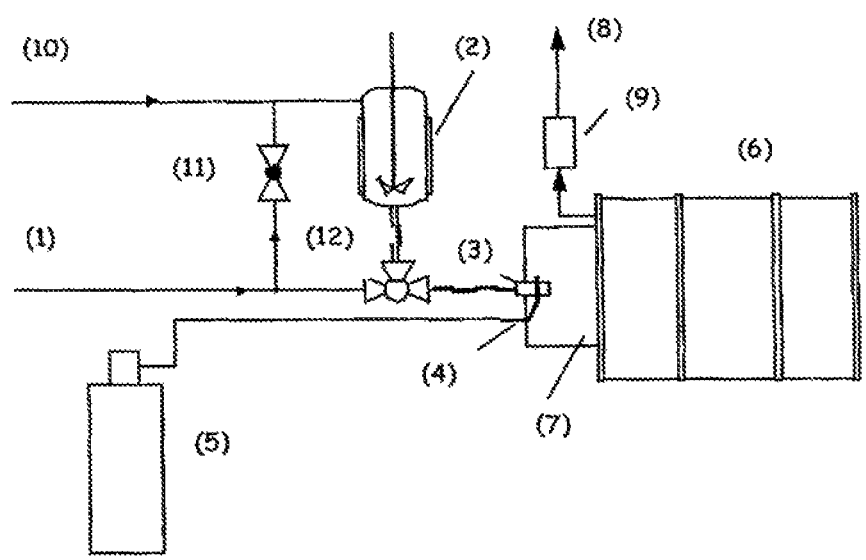
Figure 2:
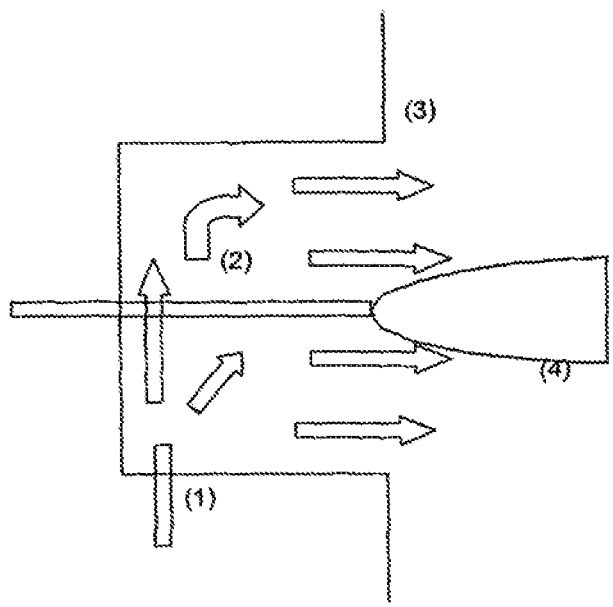

| | | |
|---|---|---|
| 5,916,608 A | 6/1999 | Lanting et al. |
| 6,020,003 A | 2/2000 | Stroh et al. |
| 6,031,118 A | 2/2000 | Van Amerongen et al. |
| 6,056,791 A | 5/2000 | Weidner et al. |
| 6,106,886 A | 8/2000 | van Amerongen et al. |
| 6,117,478 A | 9/2000 | Dubberke |
| 6,129,944 A | 10/2000 | Tiainen et al. |
| 6,156,370 A | 12/2000 | Huizinga et al. |
| 6,190,680 B1 | 2/2001 | Sakurada et al. |
| 6,217,920 B1 | 4/2001 | Van Endenburg et al. |
| 6,248,389 B1 | 6/2001 | Biller et al. |
| 6,316,030 B1 | 11/2001 | Kropf et al. |
| 6,322,842 B1 | 11/2001 | Reddy et al. |
| 6,352,737 B1 | 3/2002 | Dolhaine et al. |
| 6,395,324 B1 | 5/2002 | Effey et al. |
| 6,423,326 B1 | 7/2002 | Shapiro |
| 6,423,363 B1 | 7/2002 | Traska et al. |
| 6,468,578 B1 | 10/2002 | Bodor et al. |
| 6,582,749 B2 | 6/2003 | Merrick et al. |
| 6,743,450 B2 | 6/2004 | Romanczyk, Jr. et al. |
| 6,800,317 B2 | 10/2004 | Wester et al. |
| 6,827,964 B2 | 12/2004 | Wester et al. |
| 6,929,816 B2 | 8/2005 | Wester |
| 7,601,184 B2 | 10/2009 | Tischendorf |
| 8,025,913 B2 * | 9/2011 | van den Berg et al. ........ 426/602 |
| 8,124,152 B2 | 2/2012 | Janssen et al. |
| 8,147,895 B2 | 4/2012 | Barendse et al. |
| 2002/0034577 A1 | 3/2002 | Vogensen |
| 2002/0048606 A1 | 4/2002 | Zawistowski |
| 2002/0076476 A1 | 6/2002 | Kuil et al. |
| 2002/0132035 A1 | 9/2002 | Tamarkin et al. |
| 2002/0168450 A1 | 11/2002 | Drudis et al. |
| 2003/0068425 A1 | 4/2003 | Khare |
| 2003/0124228 A1 | 7/2003 | Goto et al. |
| 2003/0124288 A1 | 7/2003 | Merziger et al. |
| 2003/0165572 A1 | 9/2003 | Auriou |
| 2003/0203854 A1 | 10/2003 | Pischel et al. |
| 2004/0076732 A1 | 4/2004 | Valix |
| 2004/0101601 A1 | 5/2004 | Loh et al. |
| 2004/0105931 A1 | 6/2004 | Basheer et al. |
| 2004/0126475 A1 | 7/2004 | Hashizume et al. |
| 2004/0166204 A1 | 8/2004 | Smith et al. |
| 2004/0197446 A1 | 10/2004 | Haynes et al. |
| 2005/0069625 A1 | 3/2005 | Chimel et al. |
| 2005/0123667 A1 | 6/2005 | Sakuma et al. |
| 2005/0170062 A1 | 8/2005 | Burling et al. |
| 2005/0175745 A1 | 8/2005 | Zawistowski |
| 2005/0196512 A1 | 9/2005 | Nakhasi et al. |
| 2006/0019021 A1 | 1/2006 | Plank et al. |
| 2006/0035871 A1 | 2/2006 | Auweter et al. |
| 2006/0051479 A1 | 3/2006 | Chiavazza et al. |
| 2006/0115553 A1 | 6/2006 | Gautam et al. |
| 2006/0280855 A1 | 12/2006 | Van den Berg et al. |
| 2007/0054028 A1 | 3/2007 | Perlman et al. |
| 2008/0089978 A1 | 4/2008 | Grigg et al. |
| 2008/0187645 A1 | 8/2008 | Ekblom et al. |
| 2008/0193628 A1 | 8/2008 | Garbolino et al. |
| 2008/0226786 A1 | 9/2008 | Ward et al. |

FOREIGN PATENT DOCUMENTS

| | | | |
|---|---|---|---|
| EP | 21483 A1 | 1/1981 | |
| EP | 089082 | 9/1983 | |
| EP | 0237120 A1 | 9/1987 | |
| EP | 0294692 A | 12/1988 | |
| EP | 393963 A2 | 4/1990 | |
| EP | 572051 A1 | 3/1993 | |
| EP | 572051 A1 | 3/1993 | |
| EP | 744992 | 8/1995 | |
| EP | 0775444 A1 | 5/1997 | |
| EP | 0780058 A1 | 6/1997 | |
| EP | 0796567 A1 | 9/1997 | |
| EP | 0744992 B1 | 10/1997 | |
| EP | 897671 B1 | 2/1999 | |
| EP | 0898896 A1 | 3/1999 | |
| EP | 0962150 A2 | 12/1999 | |
| EP | 1114674 A2 | 7/2001 | |
| EP | 1180545 A1 | 2/2002 | |
| EP | 1197153 A1 | 4/2002 | |
| EP | 1238589 | 8/2002 | |
| EP | 1285584 A2 | 2/2003 | |
| EP | 1419698 A1 | 5/2004 | |
| EP | 1557090 A1 | 7/2005 | |
| EP | 1795257 A1 | 6/2007 | |
| EP | 1815752 A1 | 8/2007 | |
| EP | 2016834 A1 | 1/2009 | |
| EP | 2123164 A1 | 11/2009 | |
| EP | 2181604 A1 | 5/2010 | |
| FR | 2776167 | 9/1999 | |
| GB | 2095968 A | 10/1982 | |
| GB | 2208296 A | 3/1989 | |
| JP | 62239949 | 10/1987 | |
| JP | 62239949 A | 10/1987 | |
| JP | 02299544 | 12/1990 | |
| JP | 2003210107 | 7/2003 | |
| WO | WO9308699 | 5/1993 | |
| WO | WO9521688 | 8/1995 | |
| WO | WO9614755 A1 | 5/1996 | |
| WO | WO9619115 A1 | 6/1996 | |
| WO | WO9638047 | 12/1996 | |
| WO | WO9742830 | 11/1997 | |
| WO | WO9847386 | 10/1998 | |
| WO | WO9956558 | 11/1999 | |
| WO | WO0041491 | 7/2000 | |
| WO | WO0045648 A1 | 8/2000 | |
| WO | WO0100046 A1 | 1/2001 | |
| WO | WO0132035 A1 | 5/2001 | |
| WO | WO0143559 A2 | 6/2001 | |
| WO | WO0166560 A2 | 9/2001 | |
| WO | WO0178529 A2 | 10/2001 | |
| WO | WO0191569 A2 | 12/2001 | |
| WO | WO02100183 | 12/2002 | |
| WO | WO03043430 A1 | 5/2003 | |
| WO | WO03084337 | 10/2003 | |
| WO | WO03966817 A1 | 11/2003 | |
| WO | WO03103633 A1 | 12/2003 | |
| WO | WO2004093571 A1 | 11/2004 | |
| WO | WO2005014158 | * | 2/2005 |
| WO | WO2005071053 A1 | 8/2005 | |
| WO | WO2005074717 A1 | 8/2005 | |
| WO | WO2005074726 A1 | 8/2005 | |
| WO | WO2006005141 A2 | 1/2006 | |
| WO | WO2006066979 A1 | 6/2006 | |
| WO | WO2006079445 A1 | 8/2006 | |
| WO | WO2006087090 A1 | 8/2006 | |
| WO | WO2006087091 A2 | 8/2006 | |
| WO | WO2006087092 A1 | 8/2006 | |
| WO | WO2006087093 A1 | 8/2006 | |
| WO | WO2007022897 A1 | 3/2007 | |
| WO | WO2007024770 A2 | 3/2007 | |
| WO | WO2007039020 A1 | 4/2007 | |
| WO | WO2007039040 A1 | 4/2007 | |
| WO | WO2007096211 A1 | 8/2007 | |
| WO | WO2007096243 A1 | 8/2007 | |
| WO | WO2008125380 A1 | 10/2008 | |
| WO | WO2009068651 A1 | 6/2009 | |
| WO | WO2010060713 A1 | 6/2010 | |
| WO | WO2010069746 A1 | 6/2010 | |
| WO | WO2010069747 A1 | 6/2010 | |
| WO | WO2010069750 A1 | 6/2010 | |
| WO | WO2010069751 A1 | 6/2010 | |
| WO | WO2010069752 A1 | 6/2010 | |
| WO | WO2010069753 A1 | 6/2010 | |
| WO | WO2011160921 A1 | 12/2011 | |

OTHER PUBLICATIONS

Co-pending application Dobenesque et al., U.S. Appl. No. 13/133,956, filed Jul. 8, 2011.

Co-pending application Bezemer et al., U.S. Appl. No. 13/139,580, filed Sep. 8, 2011.

Co-pending application Dobenesque et al., U.S. Appl. No. 13/133,952, filed Aug. 23, 2011.

(56) References Cited

OTHER PUBLICATIONS

Opposition dated Aug. 30, 2012 by Kerry Group in EP 1865786 (corresponds to U.S. Appl. No. 13/435,943).
Opposition dated Aug. 30, 2012 by Feyecon Group in EP 1865786 (corresponds to U.S. Appl. No. 13/435,943).
Garti, et al. 1998 "Stabilization of Water-in-oil Emulsions by Subrnicrocrystalline alpha-form Fat Particles" JAOCS, vol. 75, No. 12 (1998), 1825-1831.
Munuklu et al. Supercritical Carbon Dioxide, Chapter 23, pp. 353-369, ACS Symposium Series, vol. 860 (2003).
Johansson, et al. JAOCS, 72, No. 8 (1995) 939-950.
Hydrogenation, Wikipedia Hydrogenation, 10 PP.
Gunstone et al, 2007, Food uses of oils and fats, The Lipid Handbook, Third Edition, 336-341.
Davidsson, Powdered fats for soups and sauces—and a range of other food products, Food Ingredients and Analysis International, 2001, 29-30, 23 (4).
Co-pending U.S. Appl. No. 13/133,954, filed Jun. 10, 2011.
Kochhar, "Influence of Processing on Sterols of Edible Vegeable Oils", Prog. Lipid Res., 1983, 22, pp. 161-188.
Lipson et al., "Interpretation of X-Ray Powder Diffraction Patterns", 1970, Chapter 9, pp. 244-263.
Lopez et al., "Milk fat and primary fractions obtained by dry fractionation 1. Chemical composition and crystallisation properties", Chemistry and Physics of Lipids, 2006, 144 17-33.
Micallef et al., "Beyond blood lipids: phytosterols, statins and omega-3 polyunsaturated fatty acid therapy for hyperlipidemia", Journal of Nutritional Biochemistry, 2009, 20, 927-939.
Elvers et al., Margarines and shortenings, Ullmanns Encyclopedia of Industrial Chemistry, 5th Ed., vol. A16, 156-158.
Munuklu et al., Particle formation of edible fats using the supercritical melt micronization process (ScMM). The Journal of Supercritical Fluids, 2007, 43 181-190.
Pernetti et al,, "Structuring of edible oils by alternatives to crystalline fat", Current Opinion in Colloid and Interface Science, 2007, 12, 221-231.

\* cited by examiner

PROCESS FOR THE PREPARATION OF AN EDIBLE DISPERSION COMPRISING OIL AND STRUCTURING AGENT

FIELD OF THE INVENTION

The present invention relates to a process for the preparation of an edible dispersion comprising oil and structuring agent, in particular to such dispersions comprising oil and structuring agent as continuous phase and a dispersed phase. The dispersed phase may be an aqueous liquid (thus forming a water-in-oil emulsion) or a solid particulate matter (thus forming a suspension). The invention further relates to the use of micronised fat powder to stabilise oil-containing dispersions.

BACKGROUND OF THE INVENTION

Edible dispersions comprising oil and structuring agent are well known. Examples of well-known products that substantially consist of such edible dispersions are water-in-oil emulsions, such as for instance margarines and spreads. These edible dispersions typically have an oil phase that is a blend of liquid oil and fat that is solid at normal ambient temperature (20° C.). This solid fat, often also designated as hardstock, acts as structuring agent, and its function is to stabilise the dispersion. For a margarine or spread, ideally the structuring agent has such properties that it should have melted or dissolved at mouth temperature, otherwise the product has a heavy, waxy mouthfeel.

Other known dispersions comprising oil and structuring agent are disclosed in EP-A-775444 and WO 98/47386. Herein the dispersed phase is a dry particulate matter, such as e.g. flour, starch, salt, spices, herbs etc.

Generally, the edible dispersions comprising structuring agent are prepared according to prior art processes that encompass the following steps:
1) dispersion of the aqueous phase and/or the solid phase through the oil phase, at a temperature where the oil phase, including the structuring agent is liquid;
2) formation of a fat crystal network to stabilise the resulting dispersion and give the product some degree of firmness;
3) modification of the crystal network to produce the desired firmness and confer plasticity.

These steps are usually conducted in a process that involves apparatus that allow heating, cooling and mechanical working of the ingredients, such as the churn process or the votator process. The churn process and the votator process are described in Ullmanns Encyclopedia, Fifth Edition, Volume A 16 pages 156-158. Using these techniques excellent dispersions (spreads) having high emulsion stability and good melting properties in the mouth can be prepared.

However, a disadvantage of the known processes is that the process involves a heating step and a cooling step and therefore requires a lot of energy. In a dispersion with for instance 4 wt. % structuring agent the whole weight of the dispersion (100 wt. %) needs to be heated and cooled. Another disadvantage of the known processes is that the choice of fats that can practically be used as structuring agent is rather limited. If the melting point of the structuring agent is too high the melting properties in the mouth are unsatisfactory. If on the other hand, the melting point is too low, the emulsion stability will be negatively affected. Moreover the amount of saturated fatty acids in the structuring agent is usually relatively high. Saturated fatty acids are a known risk factor for cardiovascular health.

Further disadvantage of the known processes is that the product may deteriorate due to the changes in temperature caused by the heating and cooling step and that heat-sensitive ingredients cannot be incorporated.

Powdered fat is well known in the prior art. It may be prepared according to various processes, known in the art. Micronised fat is also known in the prior art. EP-B-744992 describes the preparation of micronised fat particles by dissolution of gas (carbondioxide) in the fat under pressure and decompressing the mixture in such way that the temperature falls below the solidification point of the fat, so that micronised particles are formed.

EP-A-1238589 describes a method for forming a food product, which contains an emulsion in which the food product in liquid form is contacted with a cryogen so as to cool the liquid product and effect a rapid conversion of the liquid to a solid. A disadvantage of this known process is that still the whole emulsion has to be heated above the melting point of the structuring agent.

SUMMARY OF THE INVENTION

It is therefore an object of the invention to provide a process that requires less energy for the preparation of a dispersion comprising the structuring agent. Another object is to provide such a process that allows the use of more types of structuring agent, especially more sorts of hardstock. A further object of the invention is a reduction of the amount of saturated fatty acids in the hardstock. Still a further object of the invention is to provide a process for the preparation of a dispersion that allows the incorporation of heat-sensitive ingredients and/or that avoids deterioration of the emulsion.

One or more of these objects is attained according to the invention that provides a process for the preparation of an edible dispersion comprising oil and structuring agent and one or more of an aqueous phase and/or a solid phase, in which the dispersion is formed by mixing oil, solid structuring agent particles and the aqueous phase and/or the solid phase, wherein the solid structuring agent particles have a microporous structure of submicron size particles. Preferably, the solid structuring agent particles are at least 50% alpha-polymorph.

According to the invention the heating and cooling step of the emulsion ingredients that is needed in the prior art processes may be omitted or reduced and a stable dispersion can be made.

Preferably, the solid structuring agent particles are at 50% or more alpha-polymorph, more preferably 70% or more alpha-polymorph and most preferably 90% or more alpha-polymorph.

DETAILED DESCRIPTION OF THE INVENTION

The invention relates to a process for the preparation of a dispersion. A dispersion is herein defined as a system in which two or more phases that are insoluble or only slightly soluble are distributed in one another.

The dispersion may be an emulsion, a suspension or foam or any combination thereof, it may be oil continuous, water continuous or bi-continuous. Preferably the dispersion is oil continuous, more preferably an oil continuous emulsion or oil continuous suspension.

Where a solid phase is present in the dispersion according to the invention, it is preferably a solid phase of dry particulate matter.

Where an aqueous phase is present in the dispersion according to the invention, it is preferably a dispersed aqueous phase.

According to the invention, the dispersion is formed by mixing oil, the solid structuring agent particles and the other phase or phases of the dispersion, such as for example an aqueous phase, a solid phase and/or a gas phase. The mixing of the ingredients may be done in any order, i.e. the ingredients/phases may all be mixed in one mixing step or alternatively the mixing may be executed in more than one step. For instance an oil phase with the structuring agent particles may be mixed and a water phase may be prepared separately and later mixed with the oil phase.

Figure 6:
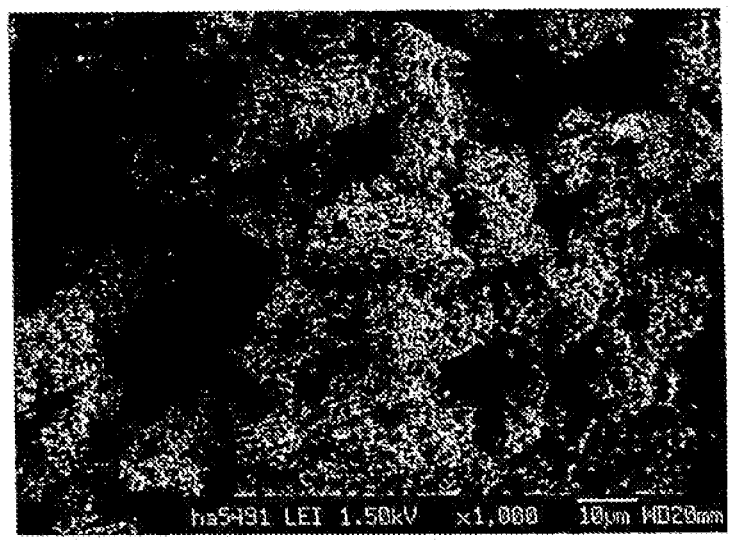
Figure 7:
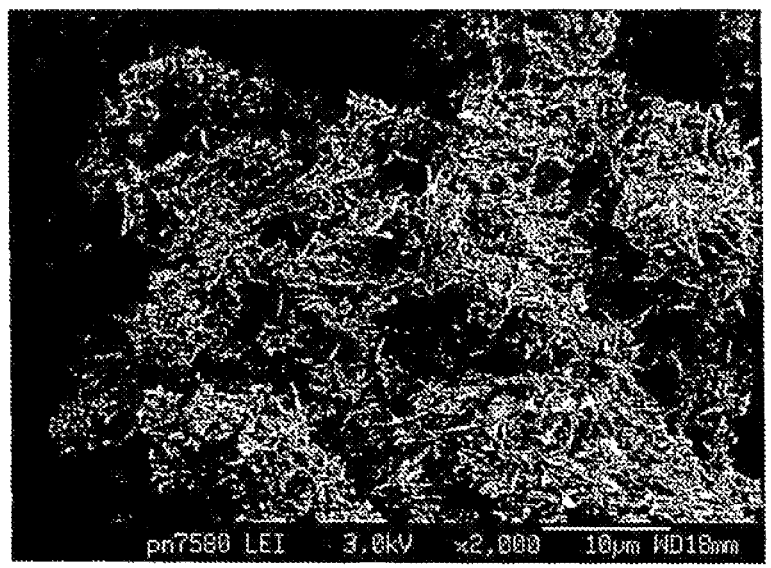

According to the invention, the solid structuring agent particles should have a microporous structure of submicron size particles. An example of a microporous structure according to the invention is shown in FIGS. 6 and 7 hereafter. The submicron particles typically have the shape as shown in FIG. 7, and consist of platelets with submicron dimensions. The thickness of the platelets should be submicron, preferably the thickness is on average 0.01-0.5 µm, more preferably 0.03-0.2 µm, even more preferably 0.06-0.12 µm.

Figure 10:
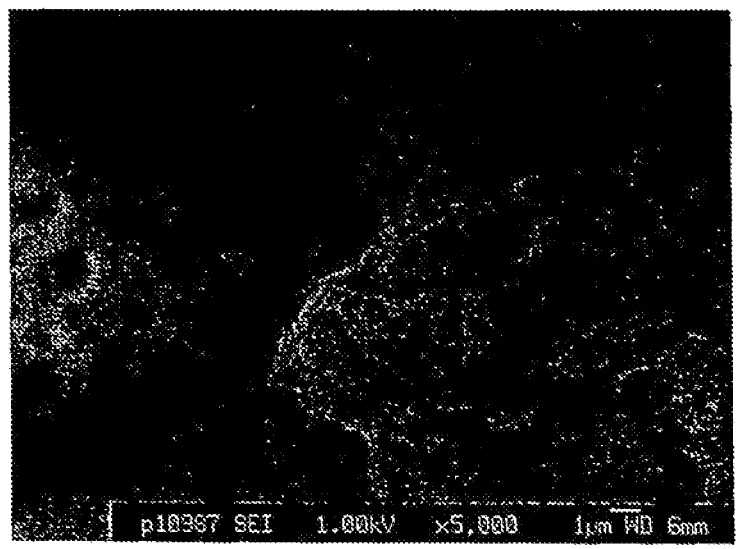

Equivalent good results were obtained for a microporous structure of more bubble-like shape, such as shown in FIG. 10, hereafter. In such microporous structure the wall thickness of the bubbles should be submicron, for instance on average 0.01-0.5 µm, more preferably 0.03-0.2 µm, even more preferably 0.06-0.12 µm.

The microporous structure, may, in the course of the preparation of the dispersion, for instance through the force of a mixer, be broken into submicron particles. The resulting submicron particles will form the structuring network of the dispersion.

Preferably, the structuring agent is edible fat. Edible fats consist predominantly of triglycerides. Typically such edible fats suitable as structuring agent are mixtures of triglycerides, some of which have a melting point higher than room or ambient temperature and therefore contain solids in the form of crystals.

The solid fat structuring agent, also denoted as hardstock or hardstock fat, serves to structure the fat phase and helps to stabilise the dispersion.

For imparting to common margarine a semi-solid, plastic, spreadable consistency this stabilising and structuring functionality plays an important role. The crystals of the solid fat form a network throughout the liquid oil resulting into a structured fat phase. The aqueous phase droplets are fixed within the spaces of the lattice of solid fat crystals. In this way coalescence of the droplets and separation of the heavier aqueous phase from the fat phase is prevented.

Generally, fats with a high content of HUH triglycerides show good structuring properties. H denotes a C16-C24 saturated fatty acid residue, such as palmitic acid (C16) or stearic acid (C18) and U denotes an unsaturated C18 fatty acid residue, such as oleic acid (C18:1) or linoleic acid (C18:2). Examples of suitable edible fat structuring agents (hardstock fats) are palm oil partially hydrogenated to a melting point of 44° C. or an interesterified mixture of palm oil and a lauric fat.

Further common ingredients of the fat phase are emulsifiers, such as monoglycerides and lecithin, colouring agents and flavours.

The structuring agent should be added to the dispersion in the form of solid structuring agent particles. Preferably the solid structuring agent particles should have an alpha-polymorph.

The following nomenclature of the polymorphic forms of the structuring agent is used herein:

1. α-polymorph (alpha polymorph): a form that gives only one short-spacing line in the X-ray diffraction pattern near 4.15 Å.
2. β'-polymorph (beta-prime polymorph): a form that gives two short spacing lines near 3.80 Å and 4.20 Å in the X-ray diffraction pattern and also shows a doublet in the 720 $cm^{-1}$ in the infrared absorption spectrum
3. β-polymorph (beta polymorph): a form that does not satisfy criteria 1. or 2.

See for an explanation of polymorphism and the above definition: Gunstone, F. D.; Harwood, J. L.; Padley, F. B.; The Lipid Handbook, second edition, Chapman and Hall, page 405.

The solid structuring agent particles preferably have an average particle size ($D_{3,2}$) of 60 micrometer or less, more preferably the solid structuring agent particles have an average particle size of 30 micrometer or less. The average particle size ($D_{3,2}$) is determined as indicated in the examples.

Preferably the solid structuring agent particles are prepared using a micronisation process. In the micronisation process the solid structuring agent particles are prepared by preparing a homogeneous mixture of structuring agent and liquified gas or supercritical gas at a pressure of 5-40 MPa and expanding the mixture through an orifice, under such conditions that a spray jet is applied in which the structuring agent is solidified and micronised. The liquified gas or supercritical gas may be any gas that may be used in the preparation of food products, for example carbondioxide, propane, ethane, xenon or other noble gases. Carbondioxide and propane are preferred. Carbondioxide is most preferred. Advantages of carbondioxide are that it has a mild (31° C.) critical temperature, it is non-flammable, nontoxic, environmentally friendly and it may be obtained from existing industrial processes without further contribution to the greenhouse effect. It is fairly miscible with oil and is readily recovered owing to its high volatility at ambient conditions. Finally liquid $CO_2$ is the second least expensive solvent after water.

The temperature of the mixture of structuring agent and liquified gas or supercritical gas is preferably such that the mixture forms a homogeneous mixture. Advantageously, the temperature of the mixture of structuring agent and liquified gas or supercritical gas is below the slip melting point of the structuring agent at atmospheric pressure and above the temperature at which phase separation of the mixture occurs. Under such conditions the smallest micronised particles may be obtained.

The pressure and temperature of the mixture of structuring agent and liquified or supercritical gas is preferably such that a large amount of the gas may be dissolved in the structuring agent. The amount dissolved will be determined by the phase diagram of the mixture of structuring agent and liquified or supercritical gas. At higher pressures as well as at lower temperatures more gas will dissolve in the structuring agent.

Preferably the temperature and pressure are chosen such that 10 wt. % or more, more preferably 20 wt. % or more or most preferably 30 wt. % or more of gas is dissolved in the liquid phase. The mixture of structuring agent and liquefied or supercritical gas may contain additional substances, such as for instance oil. We have found that the addition of oil may reduce sintering of the micronised particles of the structuring agent.

The mixture-containing structuring agent and liquefied or supercritical gas is depressurised over a small orifice or nozzle, to break up the mixture into small droplets. The break-up of the mixture into droplets can be assisted e.g. by internals inside the nozzle before the orifice to generate a whirl, or by passing a gas at a high flow rate near the orifice.

The mixture is depressurised into a volume where the pressure is higher than, equal to or lower than atmospheric pressure.

We have found that sintering, agglomeration and ripening of micronised particles of the structuring agent will lead to a reduced performance of the particles for structuring the dispersion.

To avoid sintering, agglomeration and/or ripening of the micronised particles, preferably a gas jet is applied in addition to the flow of the spray jet. The additional gas jet is most effective when the gas jet is positioned such that recirculation of material expanded through the orifice is reduced or avoided. Especially advantageous is a position wherein the gas from the gas jet flows essentially tangentially to the flow direction of the spray jet. Most advantageously the gas inlet for the gas jet is positioned behind the exit of the nozzle, see FIG. 2. FIG. 2 shows that the additional gas inlet (1) behind the exit of the nozzle (2) creates a gas flow (3) tangentially to the flow of the spray jet (4).

To further avoid agglomeration and ripening, the spray jet is preferably sprayed into a collection chamber, and a flow of gas having a temperature lower than the slip melting point of the structuring agent is fed into the collection chamber.

Preferably the edible dispersion according to the invention is a water and oil containing emulsion, optionally including a solid phase. The emulsions are preferably oil continuous. Examples of suitable emulsions are table spreads, dressings, soups, sauces, shortenings, cooking oils, frying oils, whipping creams and mayonnaises.

A stable dispersion is herein defined as dispersion that shows an oil exudation of less than 5% after storage for 15 weeks at 15° C., measured according to the method described in the examples.

A further preferred edible dispersion according to the invention is a dispersion of a solid matter, preferably a dry particulate matter, dispersed in a continuous phase of oil and structuring agent. Preferred material for the dry particulate matter is one or more of flour, starch, salt, herbs (e.g. dried herbs), spices and mixtures thereof. Preferably in such dispersions, the amount of solid matter is 30-75 wt. %, more preferably 40-65 wt. % based on total weight of the dispersion.

The amount of structuring agent should be such that a suitably stable dispersion is obtained. When the structuring agent is micronised fat, the amount is preferably 1-20 wt. %, more preferably 4-12 wt. % based on total weight of the dispersion.

DESCRIPTION OF THE FIGURES

FIG. 1: Schematic view of the micronisation apparatus used in the examples

FIG. 2: Schematic view of the nozzle configuration with gas inlet for tangential gas-flow.

FIG. 3: SEM Photograph of micronised fat powder prepared in example 1 (magnification 250×)

FIG. 4: SEM Photograph of micronised fat powder prepared in comparative experiment A (magnification 250×)

FIG. 5: SEM Photograph of micronised fat powder prepared in comparative experiment B (magnification 250×)

FIG. 6: SEM Photograph of micronised fat powder prepared in example 1 (magnification 1000×)

FIG. 7: Enlarged SEM photograph of the micronised fat powder of example 1

FIG. 8: Enlarged SEM photograph of the micronised fat powder of example 8

FIG. 9: Enlarged SEM photograph of the micronised fat powder of example 9

FIG. 10 Enlarged SEM photograph of the micronised fat powder of example 10

EXAMPLES

General

Method to Determine Slip Melting Point

The slip melting point of structuring agent is determined in accordance with F. Gunstone et al, The Lipid Handbook, second edition, Chapman and Hall, 1995, page 321, Point 6.2.3, Slip point.

Method to Determine $D_{3,2}$ of the Particle Size Distribution of Micronised Fat Particles Low-angle laser light scattering (LALLS, Helos Sympatic) was used to measure the average particle size ($D_{3,2}$). The fat particles were suspended in water in a quixel flow cuvette with an obscuration factor of 10-20%. The diffraction pattern was measured at 632.8 nm with a lens focus of 100 mm and a measurement range of 0.5-175 μm. Calculations were bases on the Fraunhofer theory.

A full description of the principle of LALLS is given in ISO 13320-1.

Method to Determine $D_{3,3}$ of Water Droplet Size Distribution in an Emulsion

The water droplet size was measured using a well-known low resolution NMR measurement method. Reference is made to Van den Enden, J. C., Waddington, D., Van Aalst, H., Van Kralingen, C. G., and Packer, K. J., Journal of Colloid and Interface Science 140 (1990) p. 105.

Method to Determine Oil Exudation

Oil exudation is determined by measuring the height of the free oil layer that appears on top of the product. This free oil layer is considered a product defect. In order to measure oil exudation, the product is filled into a scaled glass cylinder of 50 ml. The filling height is 185 mm. The filled cylinder is stored in a cabinet at constant temperature (15° C.). Height measurements are executed every week, by measuring the height of the exuded oil layer in mm with a ruler. Oil exudation is expressed as the height of the exuded oil layer divided by the original filling height and expressed in %. Shaking of the cylinders should be avoided.

Method to Determine Pourability

Pourability for pourable compositions according to the invention is measured according to the standard Bostwick protocol. The Bostwick equipment consists of a 125 ml reservoir provided with a outlet near the bottom of a horizontally placed rectangular tub and closed with a vertical barrier. The tub's bottom is provided with a 25 cm measuring scale, extending from the outlet of the reservoir. When equipment and sample both have a temperature of 15° C., the reservoir is filled halfway with 62.5 ml of the sample after it has been shaken by hand ten times up and down. When the closure of the reservoir is removed the sample flows from the reservoir and spreads over the tub bottom. The path length of the flow is measured after 15 seconds. The value, expressed as cm per 15 seconds is the Bostwick rating, which is used as yardstick for pourability.

Example 1

Fat Micronisation

A set-up was constructed to dissolve carbon dioxide in the melt and expand the mixture over a nozzle to atmospheric pressure. The micronised product was collected in a drum (6) of 250 liters. The set-up is illustrated in FIG. 1.

Autoclave The equipment consists of a 1-liter autoclave (2) equipped with a mechanical stirrer (6-blade turbine impeller), a water jacket for heating and a Pt-100 resistance thermometer. The inner diameter of the autoclave is 76 mm. The autoclave has connections at the top and at the bottom.

Tubing The bottom connection of the vessel was used to pressurise the system with carbon dioxide or to lead the mixture to the nozzle. A 3-way valve (12) is used to switch between $CO_2$ supply (1) and nozzle (3). To expel the mixture from the vessel the $CO_2$ is supplied to the top of the autoclave via valve (11). The length of tube between the bottom connection and the nozzle (3) is approximately 30 cm. All tubing has an outer diameter of ¼" (inner diameter approximately ⅛") and is equipped with electrical tracing. Additional gas, N2 or He, can be supplied through (10) to maintain a constant pressure inside the autoclave during the expansion over the nozzle Nozzle The nozzle (3) can be designed with different orifice diameters (opening outlet) and cores (construction of the supply to the orifice). For this work nozzles were used with an orifice of 0.34 mm and standard core. The nozzle was heated by electrical tracing and its temperature was registered by a thermocouple Pt-100.

Collection The nozzle was mounted to a Perspex tube (7) of 30 cm diameter and 20 cm length to allow observation of the jet during expansion. This transparent Perspex tube (7) with the nozzle (3) was mounted on top of an oil-drum (6) (250 liters) with a removable lid, which served as the collection chamber. The lid of the drum has an outlet (8) to allow the expanded. $CO_2$ to escape. A separator (9) retains the solid particles in the collection chamber. An additional gas jet ($CO_2$) may be supplied though nozzle (4) connected to a gas supply ($CO_2$ bottle) (5).

Loading The equipment was heated to the required temperature. Approximately 300 grams of fat (RP70, rapeseed oil hardened to a slip melting point of 70° C.) was completely melted and heated to 20 degrees above its melting point and charged into the autoclave.

Equilibrium The autoclave was pressurised in about 10 minutes through the bottom connection. During pressurisation the $CO_2$ supply to the top was closed. After reaching the final pressure the top valve was opened and the 3-way valve was closed. The melt was allowed to absorb $CO_2$ and equilibrate for 30 minutes, while stirring the mixture and supplying additional $CO_2$. The equilibrium pressure in the autoclave was 15 MPa and the temperature in the autoclave was 60° C.

Expansion To expand the melt the stirrer was stopped and the supply of additional gas to the collection chamber was turned on. Next the α-way valve was switched to supply the mixture to the nozzle. During expansion of the mixture in example 1 the pressure in the autoclave was maintained by the $CO_2$ supply. In examples 2 and 3 the pressure in the autoclave was increased to and maintained at 15 MPa by supplying He to the top of the vessel, after first equilibrating with $CO_2$.

A micronised fat powder that was obtained which was a very fine and dry solid powder. The powder was 100% alpha-polymorph. In the X-ray diffractogramme, peaks for the β' and β-polymorph were totally absent. The micronised fat powder was stored at 5° C. When stored at 5° C. the micronised fat powder stayed 100% alpha-polymorph during more than one month.

The micronisation parameters are given in table 2.

Preparation of an Edible Water-in-Oil Emulsion

A pourable margarine was prepared with the composition shown in table 1:

TABLE 1

Composition of pourable margarine

| Ingredient | Amount (wt. %) |
|---|---|
| Oil phase | |
| Sunflower oil | 79.62 |
| Micronised Rp 70 powder | 1.95 |
| Lecithin Bolec MT[1] | 0.18 |
| Fractionated lecithin Cetinol[2] | 0.10 |
| Beta-carotene (0.4 wt. % solution in sunflower oil) | 0.15 |
| Water phase | |
| Water | 16.5 |
| Sodium chloride | 1.5 |

Explanation of Table 1:

The balance of all composition to 100% is water RP 70: Rapeseed oil hardened to a slip melting point of 70° C.

1: Lecithin was hydrolysed soybean lecithin (Bolec Mont.) obtained from UMZ (Unimills Zwijndrecht, Netherlands)

2: Alcohol-soluble fraction from fractionation of native soybean lecithin with alcohol; Cetinol from UMZ.

The water phase was prepared by adding salt to distilled water and adjusting the pH of distilled water from 7.7 to 4.0 using 5 wt. % citric acid, and heated for 5 minutes in a bath of 60° C. to dissolve the solids. The oil phase was prepared by dissolving the emulsifier ingredients and β-carotene in the total amount of sunflower oil at 15° C. Subsequently the micronised fat powder was added to the oil phase carefully using a spatula and the oil phase was mixed with a Turrax at 22000 rotations per minute (rpm) for 6 minutes. Then the water phase was added to the oil phase and the resulting mixture was mixed with a Turrax for 5 minutes at 23500 rpm in a water bath at having a temperature of 15° C.

The temperature of the mixture in the Turrax increased due to the viscous dissipation. However during the whole experiment the temperature was kept below 20° C. The Turrax (type T50) was delivered by Janke & Kunkel IKA Labortechnik. This type of Turrax is designed to minimise air entrainment.

The emulsion was partly poured into a glass cylinder and partly into a twist off pot of 100 ml and both were containers were stored in a cabinet at 15° C.

Results

Figure 3:
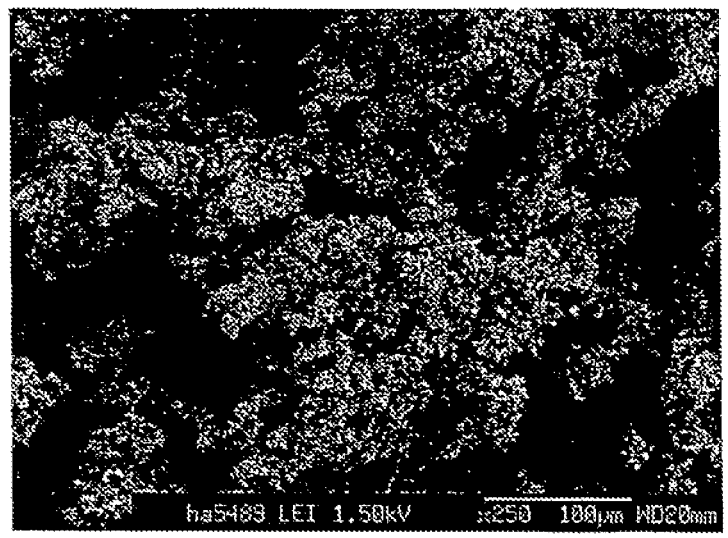

The prepared emulsions were tested in accordance with the test methods described herein and the results of the tests are given in table 3. A SEM photograph of the micronised fat powder of example 1 (magnification 250 times) is given in FIG. 3, with magnification of 1000 times in FIG. 6, and with magnification of 2000 times in FIG. 7.

Comparative Experiment A

Comparative experiment A was conducted as example 1, however the fat micronisation step was modified in that the equilibrium pressure in the autoclave was 5 MPa instead of 15 MPa. Before and during depressurisation over the nozzle the mixture in the autoclave was pressurised with Helium to 15 MPa.

Figure 4:
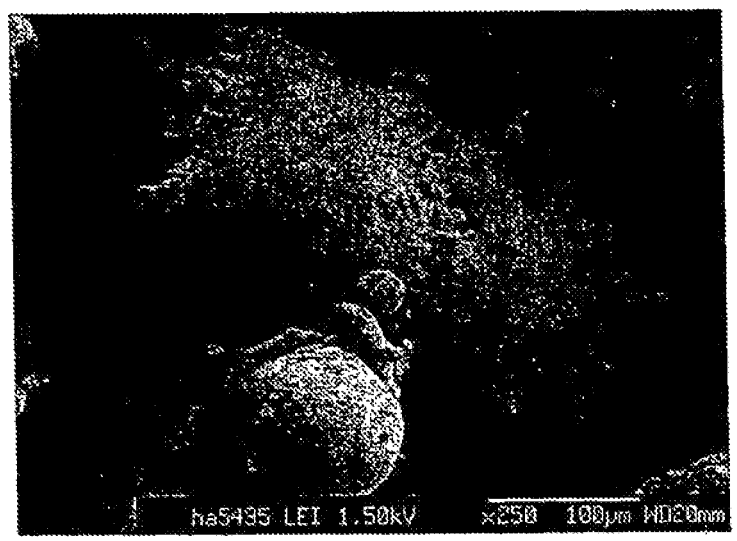

The results are shown in table 3. A SEM-photograph of the micronised fat powder is given in FIG. 4.

Comparative Experiment B

Comparative experiment B was conducted as example 1, however the fat micronisation step was modified in that the equilibrium pressure in the autoclave was 10 MPa instead of 15 MPa. Before and during depressurisation over the nozzle the mixture in the autoclave was pressurised with Helium to 15 MPa.

Figure 5:

The results are shown in table 2. A SEM-photograph of the micronised fat powder is given in FIG. 5.

All powders of example 1 and comparative experiments A and B showed the presence of 100% alpha-polymorph material. The micronised powder according to example 1 has a low particle size (see table 2) and has a microporous structure of submicron size particles, as is shown in FIG. 6. In contrast the powders of comparative experiments A and B have a higher particle size and a structure in which submicron size particles are not apparent.

TABLE 2

Micronisation parameters of example 1 and comparative experiments A and B

| Example | Equilibrium Pressure (MPa) | Temperature (° C.) | Amount of $CO_2$ Dissolved (wt. %) | $D_{3,2}$ (µm) |
|---|---|---|---|---|
| 1 | 15.0 | 60 | 19 | 39 |
| A | 5.0 | 70 | 7 | 72 |
| B | 10.0 | 60 | 16 | 75 |

TABLE 3

Oil exudation (%) of the emulsions of example 1 and comparative experiments A and B as function of the storage time at 15° C.

| Storage time | Example 1 | Comp. Ex. A | Comp. Ex. B |
|---|---|---|---|
| 1 day | | | 35.1 |
| 2 days | | | 40.5 |
| 3 days | 0 | | 48.6 |
| 1 week | 0 | 1.1 | 59.5 |
| 2 weeks | 0 | 16.2 | 59.5 |
| 3 weeks | | 18.9 | 62.2 |
| 4 weeks | | | 62.2 |
| 5 weeks | | | |
| 6 weeks | | | |
| 7 weeks | 0.5 | 18.9 | |
| 8 weeks | | | |
| 9 weeks | | | 64.9 |
| 10 weeks | | | |
| 11 weeks | 0.5 | 18.9 | |
| 12 weeks | | | |
| 14 weeks | | | 64.9 |
| 15 weeks | 0.5 | | |
| 16 weeks | | | 21.6 |

The results show that the emulsion according to example 1 shows a very low oil exudation, which whereas those of comparative experiments A and B have a high oil exudation and therefore the emulsions are not stable.

Examples 2-4

Example 1 was repeated, but now instead of fat a mixture of fat and sunflower oil was micronised. The composition of the mixture of fat and oil is shown in table 3. In the preparation of the emulsion a Turrax speed of 8000 rpm was used and the Turrax time was 4 minutes.

TABLE 4

Micronisation parameters and emulsion properties of examples 2-4

| Example | Fraction sunflower oil (wt. %) | Texture of micronised product | Bostwick (cm) | $D_{(3,3)}$ (µm) |
|---|---|---|---|---|
| 2 | 22 | Fine dry powder | 14 | 4.36 |
| 3 | 50 | Slightly granular somewhat sticky powder | 14.6 | 3.06 |
| 4 | 75 | Ointment like structure | 10 | — |

All micronised products of examples 2-4 showed the presence of alpha-polymorph material in an amount of 100% and comprised submicron size particles. '-' means not determined.

TABLE 5

Oil exudation (%) of the emulsions of examples 2 to 4 as function of the storage time at 15° C.

| Storage time | Example 2 | Example 3 | Example 4 |
|---|---|---|---|
| 1 day | 5 | 0 | 0 |
| 4 days | 18 | 0 | 0 |
| 5 days | 40 | 0 | 0 |
| 1 week | 45 | 0 | 0 |
| 2 weeks | 52 | 0.5 | 0 |
| 3 weeks | 52 | 0.5 | 0 |
| 4 weeks | 52 | 1 | 0 |
| 6 weeks | 52 | 1.5 | 0 |
| 8 weeks | 55 | 2 | 0 |
| 10 weeks | 55 | 2 | 0 |
| 12 weeks | 55 | 2 | 0 |
| 14 weeks | 55 | 2 | 0.5 |
| 16 weeks | 55 | 2 | 0.5 |

Examples 2-4 show that the addition of oil to the structuring agent prior to micronisation leads to a reduction in oil exudation of the emulsion prepared using the micronised structuring agent. The micronised mixtures have a different appearance depending on the amount of oil added.

Example 5

Micronised fat was prepared according to example 1, fat micronisation using instead as fat rapeseed oil hardened to a slip melting point of 68° C.

A dispersion of solid matter in a fat phase was prepared by first preparing a mixture of 4.6 parts (all parts are weight parts) micronised fat in 4.6 parts sunflower oil and stirring the mixture for 3 minutes at about 18° C. under vacuum. The obtained mixture was added to 49 parts sunflower oil and mixed under vacuum at about 18° C. for 1 minute.

To this mixture was added 41.2 parts flour and 0.6 parts parsley flakes (dried) and the resulting mixture was stirred under vacuum at about 18° C. for 1 minute, 30 seconds. The resulting dispersion was stable for more than one month at room temperature without substantial oil exudation.

Example 6

A dispersion was prepared with the following composition (wt. % on final product):

| Flour | 49% |
|---|---|
| Dried herb pieces | 1% |
| Sunflower oil | 45% |
| Micronised fat powder (see example 5) | 5% |

The product was prepared by mixing all ingredients at room temperature using an ultraturrax mixing equipment. The product showed no oil exudation for one month.

Example 7

A dispersion was prepared similar to that of example 6, however using 47.5 wt. % sunflower oil and 2.5 wt. % micronised fat prepared in example 1. The processing was the same. When stored at 5° C. for one month, the product showed minimal oil exudation.

Examples 8 to 10

Example 1 was repeated, however instead of Rp70, SF69 (sunflower oil hardened to a slip melting point of 69° C.) was micronised and used as hardstock in the preparation of the emulsion.

To investigate how Ta (Equilibrium autoclave tmperature) influences the morphology of the powders after micronisation, three different experiments were performed at Ta=Tm−10° C. (Example 8), Ta=Tm−5° C. (Example 9) and Ta=Tm (Example 10) respectively, with P=180 bar, in which Tm is the melting point of the hardstock, for Rp69 in these example 69° C.

Xray diffraction showed that all micronised powders are in the α polymorph. SEM analysis shows no real differences in morphology within the chosen range of temperatures, although for Tm−10° C. (59° C.) and Tm−5° C. (64° C.) the morphology seems to be a little more brittle than for Tm (69° C.).

Model Emulsions

Model emulsions were prepared using standard conditions and stored at 15° C. and 25° C. In table 6, a summary of the measured oil exudation (O.E.) and Bostwick values (BW) as function of storage time is given.

TABLE 6

Results of Examples 8-10, Oil exudation (O.E. [%]) and Bostwick values (BW [cm]) as function of storage time and temperature

| Example | Tm [° C.] | P [MPa] | Bostwick value [cm] | | | |
|---|---|---|---|---|---|---|
| | | | Start | 2 wks | 5 wks | 9 wks |
| 8 | 59 | 18 | 10 | 10 | 10 | 9 |
| 9 | 64 | 18 | 12 | 11 | 11 | 10 |
| 10 | 69 | 18 | 10 | 9 | 10 | 10 |

| | O.E. at 15° C. | | | O.E. at 25° C. | | |
|---|---|---|---|---|---|---|
| | 2 wks | 5 wks | 9 wks | 2 wks | 5 wks | 9 wks |
| 8 | 0 | 0 | 0 | 0.8 | 1.1 | 1.5 |
| 9 | 0 | 0 | 0 | 0 | 1.1 | 1.5 |
| 10 | 0 | 0 | 0 | 1.5 | 3.8 | 5.3 |

Results show that at Tm of 59° C. and 64° C., good O.E. and BW values after 9 weeks were achieved. At Tm=69° C. the oil exudation at 25° C. is less favourable.

Figure 8:
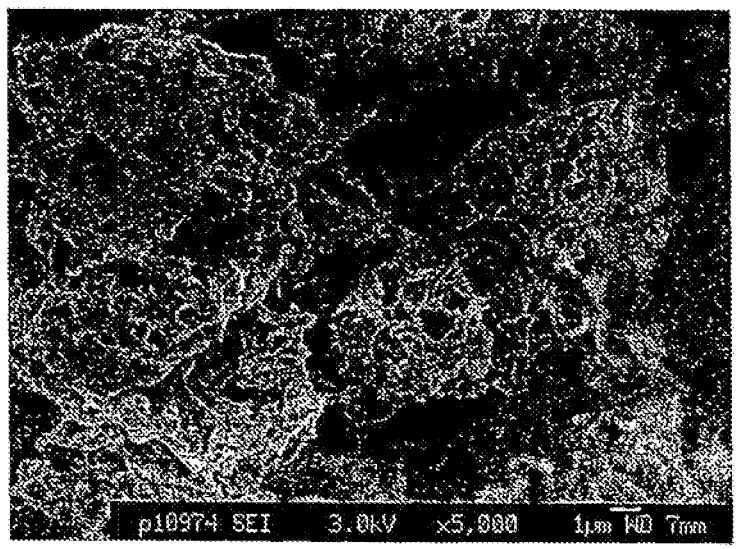
Figure 9:
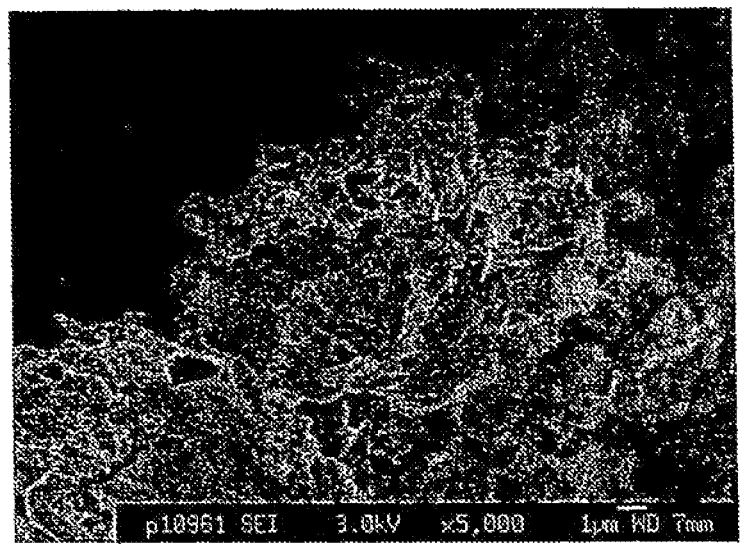

Enlarged SEM photographs (5000× magnification) of the micronised powders of examples 8, 9 and 10 are shown in FIGS. 8, 9 and 10 respectively.

The invention claimed is:

1. Process for the preparation of an edible dispersion comprising a) oil and structuring agent and b) one or more of an aqueous phase and a solid phase, comprising forming the dispersion by mixing i) oil, ii) solid structuring agent particles having a microporous structure of submicron size particles and (iii) the aqueous phase and/or the solid phase, wherein the solid structuring agent particles were made using a micronisation process by preparing a homogeneous mixture of (A) structuring agent and (B) liquefied gas or supercritical gas, at a pressure of 5-40 MPa and expanding the mixture through an orifice, under such conditions that a spray jet was applied in which the structuring agent was solidified and micronised, wherein the homogeneous mixture was formed from a melt consisting of edible fat which was mixed with x) liquefied gas or y) supercritical gas.

2. Process according to claim 1, wherein the solid structuring agent particles are at least 50% alpha-polymorph.

3. Process according to claim 1, wherein the structuring agent is edible fat.

4. Process according to claim 3, wherein the solid structuring agent particles have an average diameter $D_{3,2}$ of 60 μm or lower.

5. Process according to claim 1, wherein the edible dispersion is a water and oil containing emulsion, optionally including a solid phase.

6. Process according to claim 1, wherein the solid structuring agent particles have an average particle size $D_{3,2}$ of 30 μm or lower.

7. Process according to claim 1, wherein the homogenised mixture comprises oil.

8. Process according to claim 7, wherein the homogenised mixture comprises 10-90 wt. % based on the weight of the sum of oil and structuring agent.

9. Process according to claim 7, wherein the temperature of the mixture of structuring agent and liquified gas or supercritical gas is such that the mixture forms a homogeneous mixture.

10. Process according to claim 9, wherein the temperature of the mixture of structuring agent and liquified gas or supercritical gas is below the slip melting point of the structuring agent at atmospheric pressure and above the temperature at which phase separation of the mixture occurs.

11. Process according to claim 1, wherein a gas jet is applied in addition to the spray jet.

12. Process according to claim 11, wherein the gas jet is positioned such that re-circulation of material expanded through the orifice is reduced or avoided.

13. Process according to the claim 11, wherein the gas from the gas jet flows essentially tangentially to the flow direction of the spray jet.

14. Process according to claim 1, wherein the spray jet is sprayed into a collection chamber, and a flow of gas having a temperature lower than the slip melting point of the structuring agent is fed into the collection chamber.

15. Process according to claim 1, wherein the edible dispersion comprising oil is a water and oil containing emulsion, and includes a solid phase.

16. Process according to claim 1, wherein the edible dispersion is a dispersion of 30-75 wt. % solid matter in oil.

17. Process according to claim 16, wherein the solid matter comprises dry particulate matter.

18. Process according to claim 17, wherein the dry particulate matter comprises one or more of flour, starch, salt, dried herbs, spices and mixtures thereof.

19. The process according to claim 1 wherein the homogeneous mixture used to make the solid structuring agent comprises structuring agent and supercritical gas.

20. The process according to claim 19 wherein the supercritical gas is carbon dioxide.

21. The process according to claim 19 wherein the gas comprises carbon dioxide and the pressure is within the range of 15-40 MPa.

22. The process according to claim 1 wherein in the course of preparation of the dispersion the microporous structure is broken into submicron particles.

23. The process according to claim 1 wherein the wall thickness in the microporous structure is submicron.

24. The process according to claim 1 wherein the edible dispersion is a spread, is oil continuous, and comprises an aqueous phase.

25. Process for the preparation of an edible dispersion comprising a) oil and structuring agent and b) one or more of an aqueous phase and a solid phase, comprising preparing solid structuring agent particles using a micronisation process by preparing a homogeneous mixture of structuring agent and liquefied gas or supercritical gas at a pressure of 5-40 MPa and expanding the mixture through an orifice, under such conditions that a spray jet is applied in which the structuring agent is solidified and micronized, said structuring agent having a microporous structure of submicron size particles, and forming the dispersion by mixing i) oil, ii) the solid structuring agent particles, and iii) the aqueous phase and/or the solid phase, and wherein the homogeneous mixture is formed from a melt consisting of edible fat which is mixed with x) liquefied gas or y) supercritical gas.

26. The process according to claim 25 wherein the homogeneous mixture used to make the solid structuring agent comprises structuring agent and supercritical gas.

27. The process according to claim 26 wherein the supercritical gas is carbon dioxide.

28. The process according to claim 25 wherein the gas comprises carbon dioxide and the pressure is within the range of 15-40 MPa.

29. The process according to claim 25 wherein in the course of preparation of the dispersion the microporous structure is broken into the submicron particles.

30. The process according to claim 25 wherein the wall thickness in the microporous structure is submicron.

31. The process according to claim 25 wherein the edible dispersion is a spread, is oil continuous, and comprises an aqueous phase.

32. A process for the preparation of an edible dispersion comprising a) oil and structuring agent and b) one or more of an aqueous phase and solid phase, comprising forming the dispersion by mixing i) oil, ii) solid structuring agent particles comprising edible fat having a microporous structure of submicron size particles, and iii) the aqueous phase and/or the solid phase, wherein the solid structuring agent particles were made using a micronisation process by preparing a homogeneous mixture of A) structuring agent and B) liquefied gas or supercritical gas, at a pressure of 5-40 MPa and expanding the mixture through an orifice, under such conditions that a spray jet was applied in which the structuring agent was solidified and micronized, said edible dispersion comprising an emulsion.

33. A process for the preparation of an edible dispersion comprising a) oil and structuring agent and b) one or more of an aqueous phase and a solid phase, comprising forming the dispersion by mixing i) oil, ii) solid structuring agent particles having a microporous structure of submicron size particles and iii) the aqueous phase and/or the solid phase, wherein the solid structuring agent particles were made using a micronisation process by preparing a homogeneous mixture of (A) structuring agent and (B) liquefied gas or supercritical gas at a pressure of 5-40 MPa and expanding the mixture through an orifice, under such conditions that a spray jet was applied in which the structuring agent was solidified and micronised, wherein the liquefied or supercritical gas was selected from the group of carbon dioxide, propane, ethane, and xenon.

34. Process for the preparation of an edible dispersion comprising a) oil and structuring agent and b) one or more of an aqueous phase and a solid phase, comprising forming the dispersion by mixing i) oil, ii) solid structuring agent particles having a microporous structure of submicron size particles and iii) the aqueous phase and/or the solid phase, wherein the solid structuring agent particles were made using a micronisation process by preparing a homogeneous mixture of A) structuring agent and B) liquefied gas or supercritical gas, at a pressure of 5-40 MPa and expanding the mixture through an orifice, under such conditions that a spray jet was applied in which the structuring agent was solidified and micronised, wherein the homogeneous mixture was formed from a melt consisting of structuring agent and oil mixed with x) liquefied gas or y) supercritical gas.

35. The process according to claim 34 wherein the melt consists of structuring agent mixed with liquefied gas or supercritical gas.

36. A process for the preparation of an edible dispersion comprising a) oil and structuring agent and b) one or more of an aqueous phase and solid phase, comprising forming the dispersion by mixing i) oil, ii) solid structuring agent powder comprising edible fat having a microporous structure of submicron size particles, and iii) the aqueous phase and/or the solid phase, wherein the solid structuring agent particles were made using a micronisation process by preparing a homogeneous mixture of A) structuring agent and B) liquefied gas or supercritical gas, at a pressure of 5-40 MPa and expanding the mixture through an orifice, under such conditions that a spray jet was applied in which the structuring agent was solidified and micronized, said edible dispersion comprising an emulsion.

37. The process according to claim 36 wherein the homogeneous mixture consists of i) structuring agent and ii) liquefied gas or supercritical gas.

38. The process according to claim 36 wherein the edible dispersion is a spread, is oil continuous, and comprises an aqueous phase.

* * * * *